United States Patent Office
3,432,503
Patented Mar. 11, 1969

3,432,503
METHOD OF REDUCING THE CHOLINESTERASE ACTIVITY OF PHOSPHORIC ACID ESTERS
John F. Ferguson, Ardsley, N.Y., assignor to Geigy Chemical Corporation, Ardsley, N.Y., a corporation of Delaware
No Drawing. Continuation-in-part of application Ser. No. 421,601, Dec. 28, 1964. This application Sept. 23, 1966, Ser. No. 581,438
U.S. Cl. 260—251     8 Claims
Int. Cl. A01n 9/36; C07f 9/08

ABSTRACT OF THE DISCLOSURE

The cholinesterase activity of O,O - diethyl - O - (2-isopropyl - 4 - methyl - 6 - pyrimidyl)-thiophosphate and other phosphoric acid ester insecticides is reduced by refluxing these esters in an inert organic solvent with a basic material such as sodium hydroxide.

---

This application is a continuation-in-part of application Serial No. 421,601, filed Dec. 28, 1964 now abandoned.

This invention pertains to an improved process for the preparation of phosphoric acid esters. More particularly, this invention relates to a method of reducing the cholinesterase activity of certain organic phosphorus insecticides which involves the treatment of these insecticides with a basic material.

The phosphorus insecticides with which this invention is concerned are phosphoric acid esters having the following general formula:

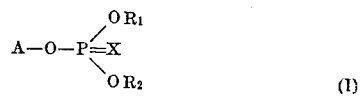

$$A-O-P{\overset{OR_1}{\underset{OR_2}{=}}}X \qquad (I)$$

wherein $R_1$ and $R_2$ are lower alkyl
X represents oxygen or sulfur, and
A represents lower alkylthio lower alkyl, substituted phenyl, N - heterocyclic, substituted N - heterocyclic and 2-oxo-2H-1-benzopyranyl groups.

These phosphoric acid esters are of great commercial value by virtue of their well-established insecticidal, nematocidal and acaricidal activity and consequent usefulness in pest control.

However, in commercial processes for the manufacture of the above phosphoric acid esters, significant amounts of impurities, the exact nature of which is not known, are frequently produced which increase the cholinesterase activity of these phosphoric acid esters. Significant amount of such impurities are also formed after manufacture due to decomposition of these phosphoric acid esters.

The term "cholinesterase activity" as used herein means inhibition of the enzymatic activity of cholinesterase. This inhibition interferes with the hydrolysis of acetylcholine and allows the accumulation of sufficiently large amounts of acetylcholine to affect nerve activity and corresponding muscular control adversely. (Wayland J. Hayes, Chemical Handbook on Economic Poisons, U.S. Dept. of Health, Education and Welfare, p. 12 (1963).)

An increase of the cholinesterase activity of the subject phosphoric acid esters due to cholinesterase-inhibiting impurities in undesirable from the point of view of operators who handle these phosphoric acid esters or warm blooded animals that may come into contact therewith. Accordingly, when a batch of phosphoric acid esters either by formation during manufacture or by decomposition after manufacture, contains those undesirable cholinesterase-inhibiting impurities to the extent of less than 1 gamma, as defined hereinbelow, the batch in the past could not be utilized commercially and was destroyed.

It is, therefore, an object of this invention to remove undesirable cholinesterase-inhibiting impurities from the above defined insecticidal phosphoric acid esters or reduce the amount of such impurities. It is another object of this invention to convert batches of phosphoric acid esters containing undesirable cholinesterase-inhibiting impurities readily and inexpensively into commercially useful batches of product.

These and other objects which will become apparent hereinbelow, are accomplished in accordance with the subject invention by refluxing a phosphoric acid ester, as defined above, in an inert organic solvent with a basic material. It is surprising and unexpected that such treatment of the phosphoric acid esters effects the desired reduction of cholinesterase activity. The reasons for this are not known.

Among the basic materials that are suitable for use in the subject process are, for example, the alkali and alkaline earth metal hydroxides and carbonates. More specifically, these basic materials which are adapted for use in the subject process are sodium hydroxide, potassium hydroxide, calcium hydroxide, potassium carbonate and sodium carbonate. Sodium hydroxide is the most preferred basic material both in terms of economics and in terms of effectiveness.

The subject process according to this invention can be carried out at any convenient temperature between the range of from about 55 to about 125° C. with a more preferred temperature range being about 77–79° C. It is understood that since the refluxing is carried out at the boiling point of the reaction mixture, the temperature will vary with the pesticidal compound utilized, the solvent employed and the concentration of the basic material.

The process of the subject reaction can be carried out in a period of time ranging from between about 30 minutes to about 5 hours or more; the optimum reaction time is dependent upon the particular phosphoric acid ester being treated. It has been found that, for most of these compounds, the preferred time range is about 2½ to 3 hours, with the most preferred reaction time being about 3 hours. When the reaction period is below the above stated limits, insignificant removal of the undesirable impurities is achieved. Conversely, when the reaction time is above the restated limits, the undesirable impurities are removed but some of the pesticidal compounds subjected to this treatment tend to decompose. Likewise, it should be noted that the optimum reaction time needed to achieve the desired results is also variable with the concentration and the specific basic material used.

Based on the amount of phosphoric acid ester to be treated, the concentration of the basic material can vary between the range of from about 0.5% to about 30% with a more preferred range being 15%–25% and a most preferred concentration being about 20%. Again, it is understood that the percentage of the basic material utilized can be varied depending on the specific basic material used, the reaction temperatures employed and the results that are desired.

In carrying out the subject process, a solution of the phosphoric acid ester is refluxed with the basic material. Among the solvents which are suitable reaction media in the subject process are such inert organic solvents as for example, benzene, toluene, xylene and aliphatic hydrocarbons having from 6–12 carbon atoms, e.g. heptane, etc.

It is advantageous to agitate the mixture during the reflux period to prevent the separation of the reaction mixture into two layers.

In one particular aspect of this invention, the phosphorus insecticides are phosphoric or thiophosphoric acid esters of substituted hydroxypyrimidines of the following formula:

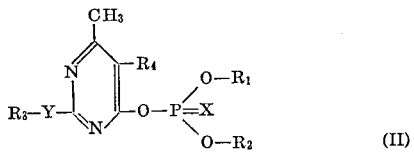

wherein $R_1$, $R_2$ and X have the significance ascribed to them in Formula I, $R_3$ represents hydrogen, alkyl, alkenyl, alkoxyalkyl or alkylmercaptoalkyl, $R_4$ stands for hydrogen, lower alkyl or lower alkenyl, and Y represents the direct carbon to carbon bond of sulfur These phosphorus compounds, which are disclosed and claimed in U.S. Patent No. 2,754,243, include particularly the dialkoxy thiophosphates, as for example, O,O-diethyl-O-(2-isopropyl-4-methyl-6-pyrimidyl) thiophosphate,

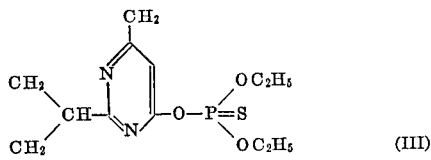

Phosphorus compounds as represented by Formula II are commercially produced by the reaction of an aliphatic phosphoric acid diester halide or an aliphatic thiophosphoric acid diester halide of the formula:

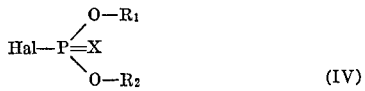

with a hydroxypyrimidine of the formula:

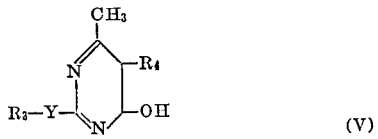

In these formulae, $R_1$, $R_2$, $R_3$, $R_4$, X and Y have the significance ascribed to them in Formulae I and II and Hal represents chorine or bromine.

In another particular aspect of this invention, the phosphorus insecticides are phosphoric or thiophosphoric acid esters of hydroxypyrazines having the following formula:

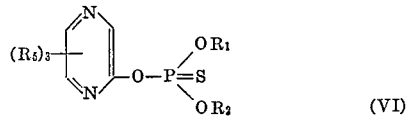

wherein $R_1$ and $R_2$ have the significance ascribed to them in Formula I, and each $R_5$ represents hydrogen or lower alkyl Included among these compounds are insecticides such as O,O-diethyl-O-(2-pyrazinyl) thiophosphate.

In still other particular aspects, this invention relates to numerous other phosphoric acid esters such as those represented by the following formula:

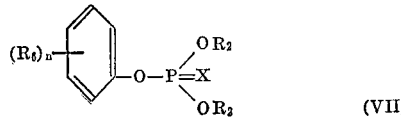

wherein $R_1$, $R_2$, and X have the significance ascribed to them in Formula I;

$R_6$ denotes lower alkyl; halogen, particularly chlorine and bromine; nitro; lower alkyl thio; and lower alkyl sulfinyl; and $n$ is an integer of from 1 to 3

Compounds embraced by Formula VI are well-known pesticides, as for example:

O,O-diethyl-O-p-nitrophenyl thiophosphate;
O,O-dimethyl-O-p-nitrophenyl thiophosphate;
O,O-dimethyl-O-(3-chloro-4-nitrophenyl)thiophosphate;
O,O-dimethyl-O-(2-chloro-4-nitrophenyl)thiophosphate;
O,O-dimethyl-O-2,4,5-trichlorophenyl thiophosphate;
O,O-diethyl-O-p-nitrophenyl phosphate;
O,O-dimethyl-O-(4-methylthio-3-tolyl) thiophosphate;
O,O-diethyl-O-2,4-dichlorophenyl thiophosphate; and
O,O-diethyl-O-p-(methylsulfinyl)phenyl thiophosphate.

Also included within the purview of phosphoric acid ester compounds of Formula I are O,O-diethyl-O-(3-chloro-4-methyl-2-oxo-2H-1-benzopyran-7-yl) thiophosphate and O,O-diethyl-O-2-ethylthioethyl thiophosphate and its thiol isomer, O,O-diethyl-S2-ethylthioethyl thiophosphate, and other well known pesticides.

For determination of cholinesterase-inhibition values, the testing procedure used in conjunction with the subject invention is the Hestrin method which is described in: Hestrin, S., Biol. Chem. 180, 549 (1949) and Cook, J. W., JAOAC 37, 561 (1964).

Briefly, the Hestrin testing procedure is as follows:

Human blood plasma containing cholinesterase and the phosphoric acid ester to be tested are combined and allowed to react. Acetylcholine is then added and the cholinesterase is allowed to hydrolize the acetylcholine. The amount of unhydrolyzed acetylcholine is measured colorimetrically. This colorimetric measurement uses the reaction of acetylcholine in alkali with hydroxylamine to form acetohydroxamic acids which are then reacted in acid solution with ferric chloride to form a soluble reddish-purple complex. This color is measured spectrophotometrically.

From this determination the amount of acetylcholine which has been hydrolyzed is calculated. The results of this determination are conventionally reported as amount of phosphoric acid ester required to inhibit 50% of cholinesterase. The unit amount of the phosphoric acid ester required for 50% inhibition is reported in terms of migrograms (gammas) per 3 ml. of volume of reagent mixture.

This invention is illustrated in greater detail by the following examples but is not limited thereby.

EXAMPLE 1

A 100 g. sample of a 50% O,O-diethyl-O-(2-isopropyl-4-methyl-6-pyrimidyl)thiophosphate-benzene solution was stirred and refluxed with 100 g. of 10% sodium hydroxide solution at a temperature of 78.5° C. for a period of 3 hours. Prior to treatment the O,O-diethyl-O-(2-isopropyl-4-methyl-6-pyrimidyl)thiophosphate had a cholinesterase-inhibition value of less than 1 gamma. After treatment with the 10% sodium hydroxide solution the O,O-diethyl-O-(2-isopropyl-4-methyl-6-pyrimidyl)-thiophosphate had a cholinesterase-inhibition value of 19 gammas.

EXAMPLE 2

A 200 g. sample of a 50% O,O-diethyl-O-(2-isopropyl-4-methyl-6-pyrimidyl)-thiophosphate-benzene solution was stirred and refluxed with 100 g. of a 10% sodium hydroxide solution at a temperature of 78.5° C. for a period of 3 hours. Prior to treatment the O,O-diethyl-O-(2-isopropyl-4-methyl-6-pyrimidyl) thiophosphate had a cholinesterase-inhibition value of less than 1 gamma. After treatment with the 10% sodium hydroxide solution the O,O-diethyl-O-(2-isopropyl-4-methyl-6-pyrimidyl)- thiophosphate had a cholinesterase inhibition value of 19 gammas.

EXAMPLE 3

A 200 g. sample having a cholinesterase-inhibition value of less than 1 was stirred and refluxed using the procedure of Example 2 except that a 5% sodium hydroxide solution was utilized. After treatment, the O,O-diethyl-O-(2-isopropyl - 4-methyl - 6-pyrimidyl)thiophosphate had a cholinesterase-inhibition value of 4–10 gammas.

EXAMPLE 4

A 400 g. sample of a 50% O,O-diethyl-O-(2-isopropyl-4-methyl-6-pyrimidyl)thiophosphate-benzene solution was stirred and refluxed with 100 g. of a 1% sodium hydroxide solution at a temperature of 78.5° C. for a period of 4 hours. Prior to treatment the O,O-diethyl-O-(2-isopropyl - 4 - methyl - 6 - pyrimidyl)thiophosphate had a cholinesterase-inhibition value of less than 1 gamma. After treatment with the 1% sodium hydroxide solution the O,O-diethyl-O-(2 - isopropyl-4-methyl - 6-pyrimidyl) thiophosphate had a cholinesterase-inhibition value of 4 gammas.

EXAMPLE 5

A 500 g. sample of a 50% O,O-diethyl-O-(2-isopropyl-4-methyl-6-pyrimidyl)thiophosphate-benzene solution was stirred and refluxed with 500 g. of a 10% potassium hydroxide solution at a temperature of 78° C. for a period of 4 hours. Prior to treatment the O,O-diethyl-O-(2-isopropyl-4-methyl-6-pyrimidyl)thiophosphate had a cholinesterase-inhibition value of less than 1 gamma. After treatment with the 10% potasium hydroxide solution, the O,O-diethyl-O - (2 - isopropyl-4-methyl-6-pyrimidyl) thiophosphate had a cholinesterase-inhibition value of 7 gammas.

EXAMPLE 6

The procedure of this run was the same as in Example 5 except that a 10% slurry of calcium hydroxide was utilized instead of a 10% sodium hydroxide solution. Prior to treatment with the calcium hydroxide the O,O-diethyl-O-(2 - isopropyl - 4-methyl-6-pyrimidyl)thiophosphate had a cholinesterase-inhibition value of less than 1 gamma. After treatment this value was 10 gammas.

EXAMPLE 7

Using the procedure of Example 5, except that a 10% solution of sodium carbonate was utilized in lieu of the 10% potassium hydroxide solution, the O,O-diethyl-O-2 - isopropyl-4-methyl-6-pyrimidyl)thiophosphate had a cholinesterase-inhibition value of less than 1 gamma prior to treatment and 4 gammas after treatment.

EXAMPLE 8

10% solution of potassium carbonate in place of the 10% potassium hydroxide solution was used to treat O,O-diethyl - O-(2-isopropyl-4-methyl-6-pyrimidyl)thiophosphate in accordance with the procedure of Example 5. Before treatment the cholinesterase-inhibition value was less than 1 gamma. After treatment it was 4 gammas.

EXAMPLE 9

A 500 g. sample of a 50% O,O-diethyl-O-(2-isopropyl-4-methyl-6-pyrimidyl)thiophosphate-toluene solution was refluxed and stirred with 500 g. of a 10% sodium hydroxide solution at a temperature of 88° C. for a period of 4 hours. The caustic layer was separated, the remaining layer washed once with 320 g. of 5% sulfuric acid and twice with 190 g. 0.2% sodium carbonate solution. The solvent was stripped off under vacuum up to a temperature of 110° C.

Prior to treatment the O,O-diethyl-O-(2-isopropyl-4-methyl-6-pyrimidyl)thiophosphate had a chlorinesterase-inhibition value of less than 1 gamma. After treatment with sodium hydroxide the O,O-diethyl-O-(2-isopropyl-4-methyl-6-pyrimidyl) thiophosphate had a cholinesterase-inhibition value of greater than 10 gammas.

EXAMPLE 10

Using the procedure of Example 9, a 500 g. sample of 50% O,O-diethyl-O-(2-isopropyl-4-methyl-6-pyrimidyl)thiophosphate-xylene solution was refluxed at 97° C. for 4 hours. Prior to treatment, the sample had a cholinesterase-inhibition value of less than 1 gamma, after treatment this value was greater than 10 gammas.

EXAMPLE 11

Using the procedure of Example 9, a 500 g. sample of 50% O,O-diethyl-O-(2-isopropyl-4-methyl-6-pyrimidyl) thiophosphate-heptane solution was refluxed at 84° C. for 4 hours. Prior to treatment the sample had a cholinesterase-inhibition value of less than 1 gamma, after treatment this value was greater than 10 gammas.

EXAMPLE 12

A 6-gram sample of technical O,O-diethyl-O-p-nitrophenyl thiophosphate was dissolved in 120 ml. of benzene then stirred and refluxed at room temperature with 100 ml of a 3% sodium hydroxide solution. After 3 hours, the temperature was increased to 55 to 63° C. and stirring and refluxing continued for an additional 12 hours. The benzene was then evaporated by an air stream.

Prior to treatment, the O,O-diethyl-O-p-nitro-phenyl thiophosphate had a cholinesterase inhibition value of 2 gammas. A sample withdrawn after 3 hours of refluxing and stirring prior to heating showed no significant change in cholinesterese inhibition value. After treatment, the O,O-diethyl-O-p-nitrophenyl thiophosphate had a cholinesterase inhibition value of greater than 6 gammas.

EXAMPLE 13

A 50-gram sample of technical O,O-diethyl-O-p-nitrophenyl thiophosphate was dissolved in 150 ml. of a 3% solution of sodium hydroxide forming a heterogeneous mass. This mass was heated and stirred for 5 hours at 60–62° C., and then was allowed to stand at room temperature for 16 hours. It was then heated for 4 hours at 60–65° C. with stirring, allowed to stand for 45 hours at room temperature with no stirring, and again heated for 4½ hours at 60–65° C. with stirring. After a total treatment of 13½ hours at 60–65° C. with stirring, the organic layer was separated off, water washed and stripped under vacuum. A weight yield of 98% was obtained.

Prior to treatment, the O,O-diethyl-O-p-nitrophenyl thiophosphate had a cholinesterase inhibition value of 2 gammas. After treatment, the sample had a cholinesterase inhibition value of greater than 6 gammas.

EXAMPLE 14

A 50-gram sample of O,O-diethyl-O-(3-chloro-4-methyl-2-oxo-2H-1-benzo-pyran-7-yl) thiophosphate, having a cholinesterase inhibition value of 1 gamma, was dissolved in 300 ml. of benzene and stirred with 100 ml. of 3% aqueous NaOH at 60–63° C. for 8½ hours. The resulting organic layer was separated, water washed, and solvent stripped on a rotary stripper to yield 44.5 grams of treated product (89% yield). This treated product had a cholinesterase inhibition value of 6 gammas.

What is claimed is:

1. A process for reducing the cholinesterase activity of a phosphoric acid ester selected from the group consisting of O,O-diethyl-O-(2-isopropyl-4-methyl - 6 - pyrimidyl)-thiophosphate, O,O-diethyl-O-(2-pyrazinyl)thiophosphate, O,O-diethyl-O-p-nitrophenylthiophosphate, O,O-dimethyl-O-p-nitrophenylthiophosphate, O,O-dimethyl-O - (3 - chloro - 4-nitrophenyl)-thiophosphate, O,O-dimethyl-O-(2-chloro-4-nitrophenyl)-thiophosphate, O,O-dimethyl-O - 2,4,5 - trichlorophenylthiophosphate, O,O-diethyl - O-p-nitrophenylphosphate, O,O-dimethyl-O-(4-methyl - thio-3-tolyl)-thiophosphate, O,O-diethyl-O-2,4- dichlorophenyl-thiophosphate, O,O-diethyl-O-p-(methylsulfinyl)-phenylthiophosphate, O,O-diethyl-O-(3-chloro-4-methyl-2-oxo-2H-1-benzopyran-7-yl)-thiophosphate, and O,O-diethyl-O-2-ethylthioethylthiophosphate, which process comprises refluxing said ester with an alkali or alkaline earth metal hydroxide or carbonate in an inert organic solvent selected from the group consisting of benzene, toluene, xylene and aliphatic hydrocarbons of 6 to 12 carbon atoms.

2. The process of claim 1 wherein said refluxing is carried out at a temperature ranging between about 55° and about 125° C.

3. The process of claim 1 wherein said alkali or alkaline earth metal hydroxide or carbonate is present in an amount of from .5% to 30% based on the amount of phosphoric acid ester.

4. The process of claim 1 wherein said hydroxide or carbonate is sodium hydroxide, potassium hydroxide, calcium hydroxide, sodium carbonate, or potassium carbonate.

5. The process of claim 1 wherein the phosphoric acid ester is O,O-diethyl-O-(2-isopropyl-4-methyl-6-pyrimidyl)-thiophosphate.

6. The process of claim 5 wherein the refluxing is done in benzene with from about 15% to about 25% of sodium hydroxide at a temperature ranging between about 78° C. to about 79° C.

7. The process of claim 1 wherein the phosphoric acid ester is O,O-diethyl-O-p-nitrophenylthiophosphate.

8. The process of claim 1 wherein the phosphoric acid ester is O,O-diethyl-O-(3-chloro-4-methyl-2-oxo-2H-1-benzo-pyran-7-yl)-thiophosphate.

No references cited.

NICHOLAS S. RIZZO, *Primary Examiner.*

U.S. Cl. X.R.

260—250, 346.2, 999